United States Patent [19]

Nagasawa et al.

[11] Patent Number: 4,721,169

[45] Date of Patent: Jan. 26, 1988

[54] ELECTRIC DRIVER WITH TORQUE-ADJUSTABLE CLUTCH MECHANISM

[75] Inventors: Takeshi Nagasawa, Nara; Jiro Kataoka, Kawanishi; Isamu Hashimoto; Yoshihiro Ikemoto, both of Osaka, all of Japan

[73] Assignee: Matsushita Electric Industrial Co., Ltd., Osaka, Japan

[21] Appl. No.: 862,947

[22] Filed: May 14, 1986

[51] Int. Cl.[4] .......... B23Q 5/00

[52] U.S. Cl. .......... 173/12; 81/469

[58] Field of Search .......... 173/12, 11, 17, 104; 81/467, 469, 473, 476

[56] References Cited

U.S. PATENT DOCUMENTS 3,892,146 7/1975 Yasoshima .......... 173/12 X 4,265,320 5/1981 Tanaka et al. .......... 173/12

4,418,765 12/1983 Mori et al. .......... 173/12

4,617,843 10/1986 Nishida et al. .......... 81/469 X

*Primary Examiner*—Paul A. Bell

*Assistant Examiner*—Willmon Fridie, Jr.

*Attorney, Agent, or Firm*—Pollock, Vande Sande & Priddy

[57] ABSTRACT

Disclosed is an electric driver which is capable of freely controlling the rotational speed of a motor or a bit. The electric driver comprises a transmission mechanism provided between a drive shaft of the motor and the bit, and the transmission mechanism includes a clutch device operated to release the bit from a driven connection with the drive shaft when a transmission torque from the drive shaft to the bit exceeds a predetermined value. The clutch device has an elastic member and the predetermined torque value is adjustable by means of the elastic member.

3 Claims, 6 Drawing Figures

ELECTRIC DRIVER WITH TORQUE-ADJUSTABLE CLUTCH MECHANISM

BACKGROUND OF THE INVENTION

1. Field of the Invention

The present invention relates to an electric tool, and in particular to a manually operated electric driver for clamping a screw or a nut.

2. Description of the Prior Art

As an electric tool for clamping a screw or a nut is known, an electric driver which, as shown in FIG. 1, includes a direct-current motor C with a brush B as a drive source for rotating a bit A. An important point relates to the need for an electric driver whose rotational speed for the screw-clamp is variable in accordance with the kind of an object to be clamped by a screw. For example, when clamping a tapping screw on a resin member, a speed which is too high results in an insufficient clamp of the screw due to the melt of the resin member, whereas the a speed which is too low causes a decrease in work efficiency. Furthermore, when clamping a tapping screw on a wooden member, the too low screw speed causes a crack on the wooden member, while the too high screw speed causes an unsatisfactory clamp because of breakage of the clamped portion of the wooden member.

For setting the screw clamping speed in accordance with the kind of object to the conventional electric driver, a special device is required, for example, detecting the rotational speed of the motor, resulting in an increase in cost.

A unique problem with the dc motor is the limited life of a brush B and the generation of dust. An exchange of the brush B should be required whenever its operating time reaches 300 to 500 hours and the generation of dust results in unsuitability for the use in a clean room.

A further problem associated with such a conventional electric driver including the dc motor C with the brush B is that a rotor D with the winding having a greater number of turns should be used for the purpose of producing a sufficient rotational torque. This results in a bulky rotor, increase in weight, and significant increase in moment of inertia of the rotor D. Therefore, the variations of the motor speed lead to the variations of the driving torque. In addition, because of the relationship between the speed and the torque, i.e., speed×torque=constant value, the torque is varied in response to the change of speed, that is, difficulty is encountered in maintaining an appropriate screw clamping torque.

SUMMARY OF THE INVENTION

An object of the present invention is therefore to provide a new and improved electric driver which overcomes the disadvantages inherent in the prior art techniques.

In accordance with a feature of the present invention, an electronically controlled brushless dc motor is employed as a drive source for driving a bit of a driver with a predetermined torque. This feature provides the following advantages: size and weight reductions of the rotor because of the elimination of the winding and considerable reduction of the moment of inertia of the rotor as compared with the conventional example. Therefore, the variations of torque due to the moment of inertia are significantly reduced irrespective of the dispersion of speed, ensuring the provision of a predetermined torque. Furthermore, the use of a brushless motor eliminates the requirement of maintenance, such as the exchange of the brush, and significantly improves durability of the electric driver. In addition, the motor speed can be freely varied with the aid of a chopper circuit, and the detection of speed for speed control can be effected by means of a Hall generator provided for the drive of a brushless motor, resulting in no increase in production cost.

According to another feature of the present invention, a transmission mechanism having a clutch function for providing the occurrence of a slip of the bit from the motor in response to a transfer torque over a predetermined value is equipped in order to ensure that the bit is driven with a predetermined torque, irrespective of the variations of torque caused by the variations of motor speed.

The predetermined torque value for screw clamping can be adjusted or changed with the selection of a spring of the transmission mechanism which determines a maximum transfer torque of the clutch system being made or the force of the spring being changed, thus enabling the setting of a desirable working torque value independently of the motor speed.

According to a further feature of the invention, an electric driver is provided with a transmission mechanism arranged to relax the reaction impact occurring when a screw has been clamped to the predetermined torque value. The transmission mechanism comprises a first pinion connected to a drive shaft coupled to the motor, a set of first gears each engaging with the first pinion, a second gear connected to a driven shaft coupled to the bit, and a set of second pinions each engaging with the second gear. Each of the second pinions is integrally coupled to each of the first gears in axially opposed relation to each other. The first gears and the second pinions are rotatably supported by the aid of a gear-supporting member rotatably held around the drive shaft and another gear-supporting member rotatably held around the driven shaft, and elastic members are provided to bias the movement of the gear-supporting members in the rotating direction.

With this arrangement, even if the reaction impact occurs due to the rotational torque by the motor and the torque by moment of inertia, the gear-supporting members and the gears supported thereby can be revolved by a given angle about the axes of the drive shaft and the driven shaft, the given angle depending on the elastic force of the elastic member. This results in absorption of the reaction impact.

In addition, a switch to turn off the drive power circuit of the motor in association with the revolution of the gear-supporting members is provided, thereby enabling the drive of the motor to be automatically stopped. This stopping of the motor drive is released in response to the gear-supporting members being returned to the original position and therefore it is possible to successfully perform the screw clamping work without manual operation of the motor.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
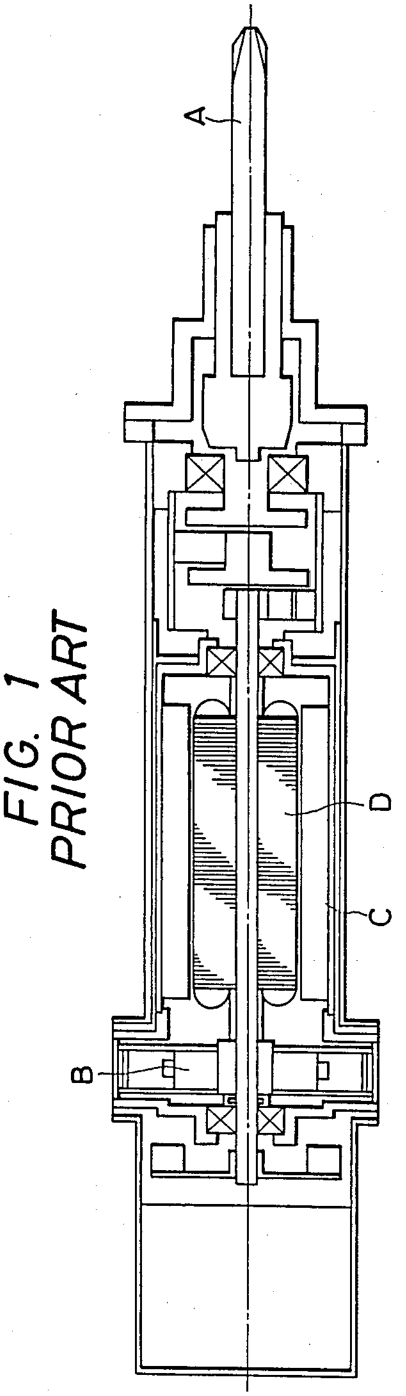
FIG. 1 PRIOR ART
FIG. 1 is a longitudinal sectional view showing a conventional electric driver.
Figure 2:
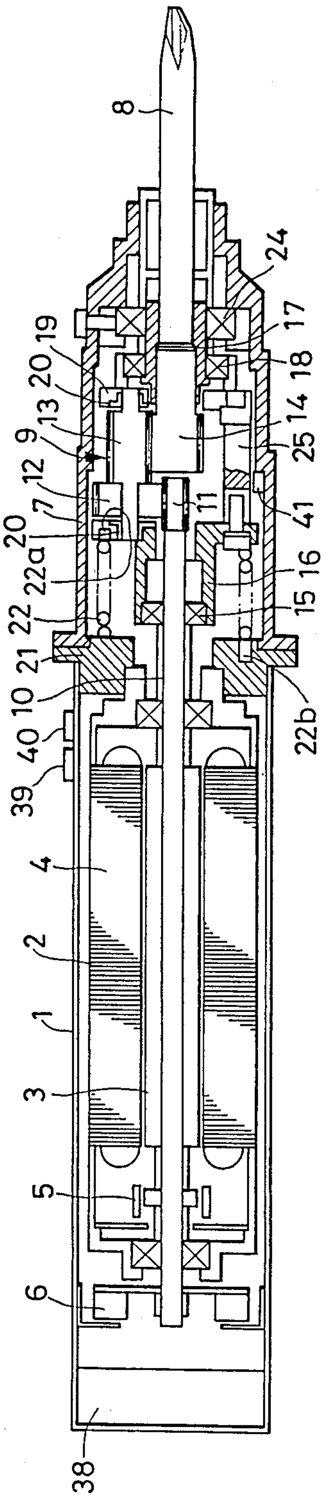
FIG. 2 is a longitudinal sectional view illustrating an electric driver according to an embodiment of the present invention.
Figure 3:
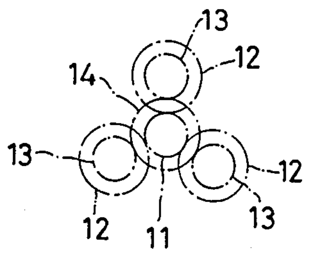
FIG. 3 is an elevational view showing a transmission gear system.

Referring now to FIG. 2, there is illustrated an electric driver according to an embodiment of the present invention including a brushless direct-current motor 2 encased in a first cover 1. The brushless dc motor 2 comprises a rotor 3 with a magnet, a stator winding 4, a cooling fan 6, and Hall generators 5. Provided in a second cover 7 coupled to an end of the first cover 1 is a transmission mechanism 9 for transferring a rotating drive power from the motor 2 to a bit 8, the torque value being varied by an increase or decrease in speed. The transmission mechanism 9, as seen in FIGS. 2 and 3, comprises a gear system including a first pinion 11 which is connected to an end of a drive shaft 10 extending into the second cover 7. The first pinion 11 is engaged with a set of first gears 12, each being coaxially integrally connected to each of a set of second pinions 13 which are in turn engaged with a second gear 14 integrally connected to the rear end of the bit 8. Therefore, the rotation of the motor 2 is transferred to the bit 8 after reduction in speed by means of the transmission mechanism 9, that is, it acts as a reduction gear mechanism. If required, it is arranged as a speed-increasing mechanism.

The second pinions 13 and the first gears 12 are supported by a gear-supporting member 16 and another gear-supporting member 19 and are rotatable with the aid of a bearing 20. The gear-supporting member 16 is disposed around the drive shaft 10 and is rotatable by means of a bearing 15, whereas the gear-supporting member 19 is disposed around a sleeve 17 for connecting between the second pinion 14 and the bit 8 and is also rotatable by means of a bearing 18. With this arrangement, the first pinion 11 and the first gears 12 can revolve along the circumferences of the drive shaft 10 and the bit 8 in association with the rotations of the gear-supporting members 16 and 19.

Springs 22 are provided between the gear-supporting member 16 and a motor-supporting member 21 attached to the first cover 1, both ends **22*a* and 22*b* of each of the springs 22 being respectively connected to the end portions of the members 16 and 21 which are in opposed relation to each other. The sleeve 17 for connecting the bit 8 to the second gear 14 is rotatably partially supported by a bearing 24. The gear-supporting members 16 and 19 are coupled to each other by the use of stays 25**.

Figure 4:
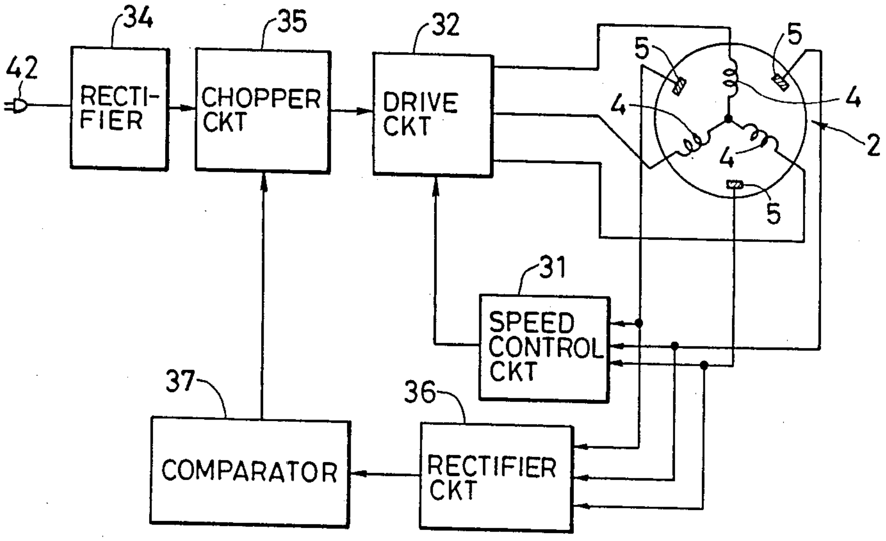
FIG. 4 is an illustration of a control circuit of a motor.

FIG. 4 is an illustration of a control circuit for the motor 2.

Figure 5:
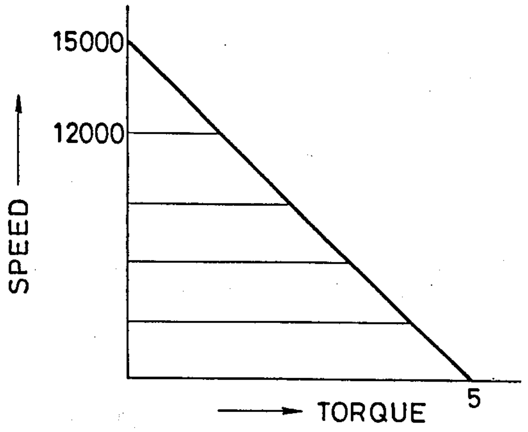
FIG. 5 is a graphic illustration of speed-vs-torque characteristic on the motor control.

A signal, indicative of the rotational speed of the drive shaft 10 obtained by each of the Hall generators 5, is supplied through a rotational speed control circuit 31 to a motor drive circuit 32, while currents which are 120 degrees out-of-phase are supplied to the stator coils 4 of the motor 2 to cause the rotor 3 thereof to rotate. A chopper circuit 35 is provided between the motor drive circuit 32 and a power rectifier circuit 34. The rotational speed signals from the Hall generators 5 are also supplied to a Hall generator signal rectifier circuit 36 and further a comparator circuit 37, and a signal from the comparator circuit 37 which has high level and low level is fed to the chopper circuit 35 for comparison with a signal corresponding to a predetermined rotational speed. The comparison is made to control the motor 2 through the motor drive circuit 32 so that the rotational speed of the drive shaft 10 is equal to the predetermined rotational speed. This motor control is performed to obtain a torque-vs-speed characteristic as shown in FIG. 5. Thus, it is possible to freely control the rotational speed of the drive shaft 10. The control circuit shown in FIG. 4 will be provided at a portion 38 in the cover 1, FIG. 2.

Turning back to FIG. 2, a main switch operating section 39 and a forward/backward rotation switch operating section 40 are respectively provided at an appropriate portion on the first cover 1. Furthermore, mounted on the inner circumference surface of the second cover 7 is a switch 41 for cutting the power supply in response to the rotation of the gear-supporting member 16 against the force of the springs 22.

In operation, when a plug 42 (FIG. 4) is connected to a power supply before a main switch of the operating section 39 is turned on, the motor 2 is driven wherein the rotating direction is determined in accordance with the operation of a forward/backward rotation switch of the operating section 40. The rotation of the motor 2, as described above, is controlled through the chopper circuit 35 on the basis of the signal from the Hall generators 5, and the rotational speed is set through a rotational speed setting section 43 mounted on the first cover 1. The speed setting will be effected with respect to the rotational speed of the bit 8 and in accordance with the kind of a screw, the kind of a work piece, and the like. The rotation of the drive shaft 10, in response to the drive of the motor 2, is transferred to the bit 8 through the transmission mechanism 9 for speed reduction corresponding to the set bit rotational speed. Since the transmission mechanism 9 is elastically coupled through the springs 22 to the motor-supporting member 21, it is positioned on operation to keep the balance between the transfer torque value and the elasticity of the springs 22.

When a screw clamping work is terminated, that is, the top of a screw has come into contact with a work piece to be clamped by the screw, the bit 8 and the second gear integrally connected thereto are instaneously stopped and, at this time, the first gears 12 and the second pinions 13 in company with the gear-supporting members 16, 19 are circumferentially rotated with respect to the first pinion 11 and the second gear 14 against the springs 22 due to the drive torque and the inertia torque. In this case, the rotation is made until the force developed by twisting the springs 22 is in proportion to the sum of the drive torque and the inertia torque. The rotation results in considerable reduction in the reaction impact caused by the instanteous stopping of the screw.

The rotating movement for the reaction impact relaxation is affected by the rigidity of the spring and therefore by properly setting or selecting the rigidity of the spring, the screw clamping can be performed up to a desirable torque value. When reaching the desirable torque value and when the rotation of the bit 8 is instaneously stopped due to the termination of the screw clamping, the bit 8 can be released from the driven connection with the drive shaft 10 with the aid of the rotating movement, and therefore the transmission mechanism 9 further acts as a clutch.

In addition, according to this embodiment, the switch 41 is automatically turned off in response to the rotating movement to temporarily cut the power supply.

Figure 6:
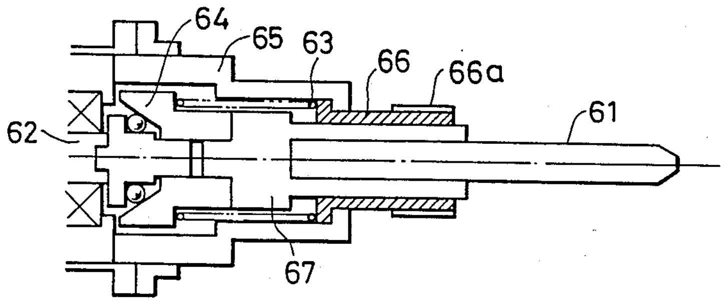
FIG. 6 is a partially sectional view illustrating an electric driver according to another embodiment of the present invention.

FIG. 6 is an illustration of an electric driver according to another embodiment of the present invention. The electric drive of FIG. 6 comprises a bit 61, a drive shaft 62, and a friction transmission mechanism including a friction clutch 64 and springs 63. The rotation of the drive shaft 62 is transferred through the clutch 64 and a bit holder 67 to the bit 61. The friction transmission mechanism is arranged such that the maximum transfer torque from the drive shaft 62 to the bit 61 is determined by the compressive force of the springs 63 to the clutch 64. The compressive force of the springs 63 is adjusted by an adjusting tube 66 which is threadedly engaged with a cover 65 at an end portion thereof and which is arranged to axially move by the rotation itself. The rotation is achieved by the operation of a ring member **66*a* which is mounted on the adjusting tube 66 and enables the change of the maximum transfer torque. It is appropriate to incorporate the second embodiment of FIG. 6 into the first embodiment of FIG. 2**.

It should be understood that the foregoing relates to only preferred embodiments of the invention, and that it is intended to cover all changes and modifications of the embodiments of the invention herein used for the purpose of the disclosure, which do not constitute departures from the spirit and scope of the invention.

What is claimed is:

1. An electric driver comprising:

(a) a bit;

(b) a brushless motor for providing the rotation for said bit;

(c) a control circuit for controlling a rotational speed of a drive shaft of said brushless motor; and (d) transmission means provided between said bit and said drive shaft for transmission from said drive shaft to said bit, said transmission means including clutch means operated to release said bit from a driven connection with said drive shaft when a transmission torque from said drive shaft to said bit exceeds a predetermined value, said clutch means including a gear system which is arranged to be circumferentially rotatable with respect to said drive shaft and said bit and further including a second elastic member, said predetermined torque value being variable by means of said second elastic member, said gear system comprising at least first and second pinions and first and second gears, said first pinion being integrally connected to an end of said drive shaft and said second gear being connected to an end of said bit, and said first gear being integrally coaxially connected to said second pinion, said first gear being engaged with said first pinion and said second pinion being engaged with said second gear.

2. An electric driver as claimed in claim 1, wherein said gear system is supported by gear-supporting menas, said elastic member being provided between said gear-supporting means and a motor-supporting means for supporting said motor, said gear-supporting means being rotated with said gear system.

3. An electric driver comprising:

(a) a bit;

(b) a brushless motor for providing the rotation for said bit;

(c) a control circuit for controlling a rotational speed of a drive shaft of said brushless motor, said control circuit including a chopper circuit for controlling the motor speed to a predetermined speed value by comparing a signal corresponding to said predetermined speed value with a signal from a Hall generator provided in said motor; and (d) transmission means provided between said bit and said drive shaft for transmission from said drive shaft to said bit, said transmission means including clutch means operated to release said bit from a driven connection with said drive shaft when a transmission torque from said drive shaft to said bit exceeds a predetermined value.

* * * * *